United States Patent Office 2,993,841
Patented July 25, 1961

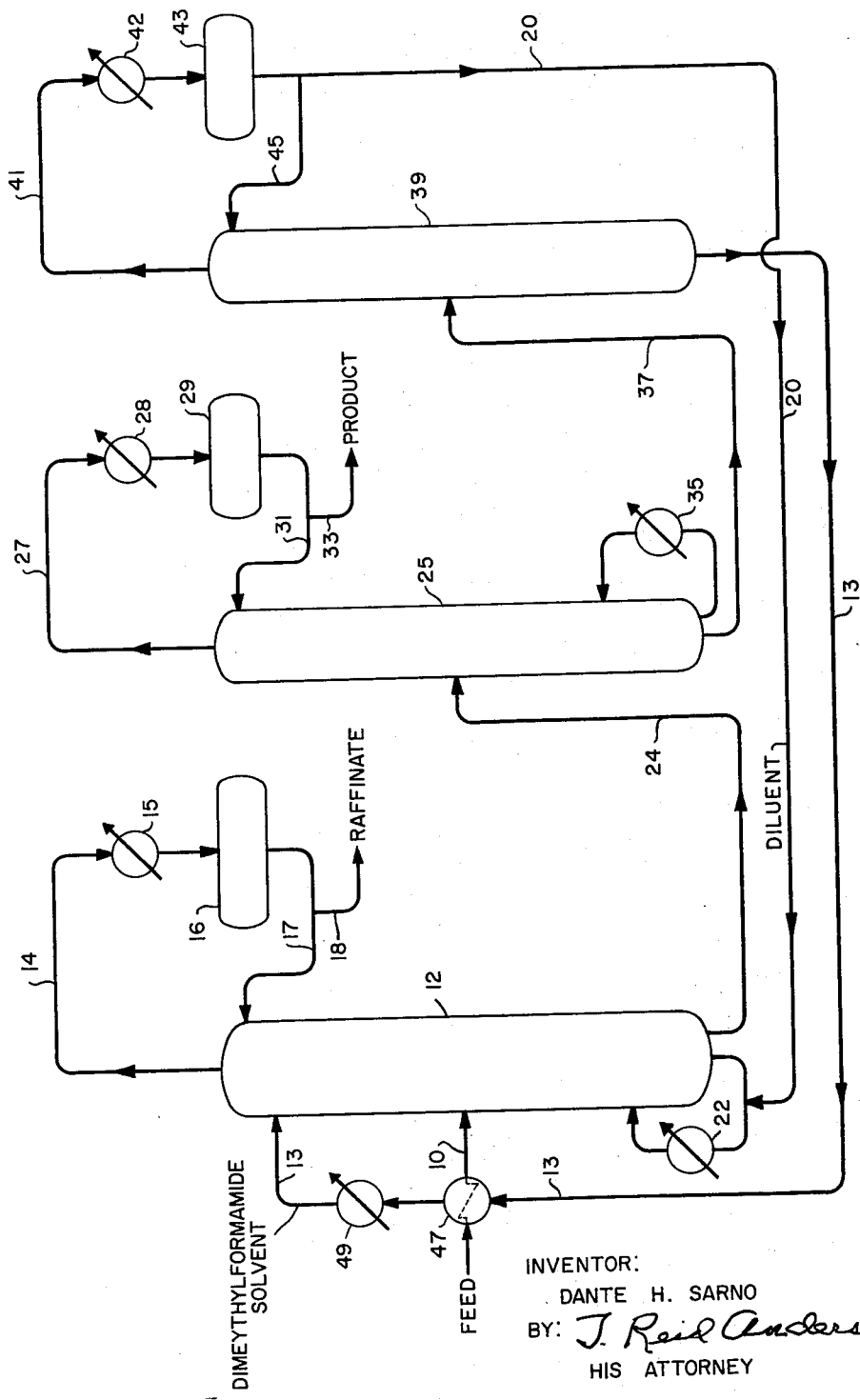

2,993,841
EXTRACTIVE DISTILLATION WITH DI-
METHYLFORMAMIDE
Dante H. Sarno, El Cerrito, Calif., assignor to Shell Oil
Company, a corporation of Delaware
Filed Sept. 25, 1959, Ser. No. 842,330
3 Claims. (Cl. 202—39.5)

This invention relates to an improved process of extractive distillation for the separation of an unsaturated $C_4$ to $C_6$ inclusive hydrocarbon from a mixture thereof containing a close boiling, more saturated material of like carbon number employing dimethylformamide as the solvent.

There are hydrocarbon mixtures whose normal volatilities are such that separation cannot be readily achieved with ordinary fractional distillation. The problem is most commonly encountered in the separation of mono-olefins from paraffins and diolefins from mono-olefins of the same carbon number. For example, in the manufacture of butadiene, the butanes are separated from the butenes and the butadiene from the butenes. The same difficult separation prevails in isoprene where it becomes necessary to separate compounds of like carbon numbers and different degrees of saturation.

Generally, the separations are achieved either by extractive distillation procedures which alter the relative volatilities of the compounds, thus making easier the separations or by processes such as the copper ammonium acetate process where the compound to be separated enters into a loose chemical combination with the extracting solution and in this manner is removed from the close boiling mixture.

Conventionally, isoprene and butadiene have been separated from their corresponding mono-olefins and paraffins by extractive distillations with low boiling solvents, such as aqueous acetone and acetonitrile. Dimethylformamide, a high boiling solvent with an attractive alpha value has been considered for the recovery of such low boiling hydrocarbons, but it has not been widely used for this purpose. The alpha value is a measure of a solvent's selectivity for the unsaturated compounds compared to a more saturated material. The objections to the widespread use of dimethylformamide have been three-fold, namely, the excessively high heat load required for solvent stripping of the extract phase, the instability of the solvent at higher temperatures, and the occurrence of polymerization of the unsaturated extract attributable to the temperatures attending the stripping operation. The high temperatures required in the reboiler of the extractive distillation also contribute to polymerization. Dimethylformamide has an atmospheric boiling temperature of 308° F. The material at a temperature in excess of 290–300° F., tends to decompose to dimethylamine and formic acid and the decomposition rate is markedly increased by the presence of water. Formic acid is highly corrosive and furthermore forms an azeotrope with dimethylformamide. These properties of dimethylformamide have created problems in the design of equipment and in the recovery of the solvent. The use of special alloys or inhibitors in any part of the plant where dimethylformamide is present is indicated for high temperature operations.

It may be said that the temperature of the available plant cooling water has often dictated the use of low boiling solvents in the extractive distillation of such low boiling hydrocarbons as isoprene and butadiene. This is because the solvent extract phase containing the separated unsaturated hydrocarbon and the solvent from the extractive distillation column must be heated to a relatively high temperature, in excess of the normal boiling temperature of the solvent to provide the elevated pressure, say 25 p.s.i.a. or thereabout in the case of a $C_5$ separation, needed to condense the hydrocarbon stripped from the extract phase with normally available plant cooling water having a temperature of say 20° C. Dimethylformamide, like many high boiling solvents, is unstable at and above its normal boiling point, which characteristic in itself may prevent its use. Additionally, where the solvent is high boiling, such as dimethylformamide, the heat load needed to effect the solvent stripping at this elevated pressure may well be prohibitive from a cost standpoint.

Various methods seemingly could be resorted to to permit the use of this high boiling, unstable solvent, but on closer examination the suggested schemes are not suitable for one reason or another. An obvious manner of operating the solvent stripper to permit the use of low pressures and low temperatures involves condensing the overhead vapors with a refrigerated cooling system. This approach is not practical because of economic considerations. Another suggestion involves the addition of water to the solvent to lower its boiling point and in this manner permit a lower temperature operation of the solvent stripper, thereby reducing the heat load and avoiding polymerization of the extract. But unfortunately, this route cannot be resorted to with dimethylformamide since its tendency to decompose is increased by the presence of water. Additionally, the maximum amount of water that may be used with dimethylformamide because of hydrocarbon miscibility limitation does not permit a satisfactorily low temperature operation from a polymerization standpoint. Furthermore the presence of water increases greatly corrosion problems. While some small amount of water may in some instances be tolerable, it is not advantageous for the foregoing reasons to employ larger amounts as is possible with some other high boiling solvents.

The advantages of the process of the invention will become more apparent from the following description of the invention as illustrated in the drawing, which consists of a sole figure which is a schematic representation of a system for the practice of a preferred embodiment of the process.

It has now been found that extractive distillation with dimethylformamide as the solvent for the recovery of low boiling unsaturated materials may be satisfactorily practiced with substantially no decomposition of the solvent or polymerization of the extract occurring. In the improved process of the invention, an unsaturated $C_4$ to $C_6$ inclusive hydrocarbon is stripped from the extract phase at a temperature substantially below the atmospheric boiling point of dimethylformamide and at a temperature below which significant polymerization of the unsaturated material occurs. The stripping is carried on in the presence of an inert hydrocarbon diluent having at least one more carbon atom than the unsaturated material of the extract and further characterized by having a lower boiling point than that of the dimethylformamide. The difference in boiling points between the diluent and dimethylformamide is at least that needed to permit their ready separation by distillation. The liquid bottoms from the stripping operation made up of dimethylformamide and diluent is removed to a distillation zone and there the diluent is taken overhead, leaving a lean dimethylformamide solvent which is returned to the extractive distillation zone.

It is necessary to the successful practice of the process in the recovery of for example isoprene to keep the extractive distillation column reboiler and solvent stripper column reboiler at temperatures below 270° F., in order to avoid excessive polymerization and fouling of the equipment resulting from polymer formation. The employment of the inert hydrocarbon diluent permits maintenance of these temperature levels and operations of the column at reasonable pressures. The inert hydrocarbon diluent is introduced into the bottom of the extractive distillation column, rather than allowing it to enter with the dimethylformamide, and in this way avoids a decrease in the relative volatilities of components of the feed which would be caused by dilution of the dimethylformamide with the hydrocarbon diluent. The admission of the diluent to the bottom of the extractive distillation column also prevents excessive loss of that diluent in the overhead, thereby eliminating the necessity of washing the overhead hydrocarbon product. The inert hydrocarbon diluent mol concentration required in the extractive distillation column bottoms to hold the reboiler temperature below 270° F. and at a reasonable pressure, say 25 to 120 p.s.i.a. is in the range of 3 to 50 percent. The amount of diluent required will vary depending, among other things, on the particular light hydrocarbon being recovered. Normal heptane is a satisfactory diluent for a $C_5$ system. For a $C_4$ system, hexane may be used. Benzene is a satisfactory diluent for the $C_5$ system. For a $C_6$ system it is recommended that toluene or a saturated $C_8$ hydrocarbon be utilized. In general the inert hydrocarbon diluent used should have at least one more carbon atom than the unsaturated material being separated. In the instance of the paraffinic solvents, a two carbon spread is preferred; however, a saturated hydrocarbon with one more carbon atom than the extracted material may be employed but to a lesser economic advantage.

The process of the invention is especially adapted to the recovery of $C_3$ to and including $C_6$ unsaturated hydrocarbons from a hydrocarbon mixture containing one of these compounds and its corresponding mono-olefin and/or paraffin. A broad spectrum feed stock containing compounds of varying carbon numbers may be used but generally fractional distillation is advantageously employed to provide a narrow cut, say a $C_4$ or $C_5$ cut for the extractive distillation. The process is particularly beneficial for the separation of $C_4$-$C_6$ hydrocarbons as the problems of dimethylformamide instability and high temperatures are emphasized in the separation of these low boiling materials from a hydrocarbon mixture.

In the example, illustrated in the accompanying flow diagram, a $C_5$ fraction from a dehydrogenation zone carried by a line 10 is introduced to an intermediate section of an extractive distillation column 12. The hydrocarbon feed is preferably introduced at a temperature of approximately 175° F. The column operates with a top pressure of approximately 29 p.s.i.a. and with a bottom pressure of approximately 43 p.s.i.a. and a bottom temperature of around 250° F. Dimethylformamide solvent with a temperature of approximately 180° F. enters a top portion of an extractive distillation column via line 13. The column has a small rectification zone with several plates at its top above the point of introduction of the solvent.

The $C_5$ raffinate substantially free of isoprene leaves the top of the column at a temperature of approximately 125° in a line 14 which opens into a condenser 15. Condensate is collected in an accumulator 16 with a portion of the $C_5$ condensate being refluxed via line 17 to the top of the column. The remainder of the $C_5$ raffinate is removed in a line 18. A stream of heptane diluent carried in a return line 20 is supplied to a reboiler 22 disposed at the base of the column.

A solvent extract phase made up of isoprene, dimethylformamide and heptane diluent is removed from the base of the extractive distillation column in a line 24 and introduced to a central section of a solvent stripper 25. The solvent stripper operates with a top pressure of approximately 26 p.s.i.a. and at a top temperature of 125° F. and with a bottom pressure of approximately 34 p.s.i.a. and a temperature of 260° F. The isoprene raffinate taken overhead from the stripper in a line 27 is cooled in a condenser 28, collected in an accumulator 29 and refluxed in part to the top of the stripper via a line 31. Isoprene product is removed from the system in a line 33. Heat for the operation of this stripper is provided by a reboiler 35.

The heptane-dimethylformamide bottoms from the stripper leave in a line 37 which opens into a central section of a recovery column 39. This latter column operates with a head temperature of around 215° F. and a head pressure of 17 p.s.i.a. The bottom of the column is maintained at a pressure of approximately 20 p.s.i.a. and at a temperature of approximately 330° F. Heptane which is removed overhead from the recovery column in a line 41 is condensed in cooler 42 and collected in accumulator 43. A portion of the condensate is refluxed to the top of the column via line 45 and the balance is returned to the reboiler of the extractive distillation column in the aforementioned line 20. Lean dimethylformamide is removed from the bottom of the column in the line 13 and returned to the extractive distillation column after first being heat exchanged against the incoming feed in heat exchanger 47, following which its temperature is further reduced in cooler 49.

I claim as my invention:

1. In an extractive distillation process for the recovery of an unsaturated $C_4$ to $C_6$ inclusive hydrocarbon from a mixture thereof containing a close boiling, more saturated material of like carbon number employing dimethylformamide as the solvent and wherein there is formed a solvent extract phase enriched in the unsaturated material, the steps comprising introducing an inert hydrocarbon diluent to the bottom portion of the extractive distillation zone, said diluent having at least one more carbon atom than the unsaturated material and characterized by having a lower boiling point less than that of the dimethylformamide, removing the extract phase including the diluent to a stripping zone and there separating overhead a vapor stream of the unsaturated material, leaving as liquid bottoms the diluent and dimethylformamide solvent; transferring the liquid bottoms to a solvent recovery distillation zone and there removing the diluent overhead, leaving a lean dimethylformamide solvent; recycling the dimethylformamide solvent to an upper portion of the extractive distillation zone and returning the diluent to the bottom portion of said zone.

2. A process in accordance with claim 1 wherein the unsaturated hydrocarbon is isoprene and wherein the hydrocarbon diluent contains principally heptane.

3. A process in accordance with claim 1 wherein the unsaturated hydrocarbon is butadiene and wherein the hydrocarbon diluent contains principally hexane.

References Cited in the file of this patent

UNITED STATES PATENTS

| | | |
|---|---|---|
| 2,356,986 | Frey | Aug. 29, 1944 |
| 2,379,332 | Arnold | June 26, 1945 |
| 2,382,603 | Buell | Aug. 14, 1945 |
| 2,386,927 | Boyd | Oct. 16, 1945 |
| 2,391,158 | Hepp | Dec. 18, 1945 |